United States Patent [19]

Black

[11] 4,237,620

[45] Dec. 9, 1980

[54] CONTACTOR

[76] Inventor: Frank M. Black, 5112 Clay Rd., Houston, Tex. 77056

[21] Appl. No.: 32,738

[22] Filed: Apr. 24, 1979

Related U.S. Application Data

[63] Continuation-in-part of Ser. No. 937,063, Aug. 28, 1978, Pat. No. 4,193,205.

[51] Int. Cl.³ .............................................. F26B 21/06
[52] U.S. Cl. ............................................. 34/72; 34/9;
34/80; 55/191
[58] Field of Search .......................... 34/9, 72, 79, 80;
55/191

[56] References Cited

U.S. PATENT DOCUMENTS

| 3,043,015 | 7/1962 | Brucken | 34/80 |
| 4,060,912 | 12/1977 | Black | 34/9 |

FOREIGN PATENT DOCUMENTS 863709  2/1971  Canada ........................................ 34/80

*Primary Examiner*—John J. Camby
*Attorney, Agent, or Firm*—Robert W. B. Dickerson

[57] ABSTRACT

An assembly for removing contaminants from gas, comprising a cylinder having therein a spiral path-forming member, a layer of absorbent fluid, and substantially filled with mass transfer media.

2 Claims, 3 Drawing Figures

CONTACTOR

This application is a continuation-in-part of application Ser. No. 937,063 filed Aug. 28, 1978, now U.S. Pat. No. 4,193,205.

BACKGROUND OF THE INVENTION

In the production and utilization of natural gas, contaminants, and particularly fluid vapors, must be removed. Drying agents, such as glycol, have long been used. In order to utilize the drying capability of such drying agents, intimate contact with the gas must be assured. A substantial improvement in the prior art is described by my U.S. Pat. No. 4,060,912, which depicts a spiral member causing gas to follow a tortuous path, at least some of which is through a drying agent. Even a greater degree of contact is desirable, however, and particularly contact wherein channelization is deterred, and wherein the path through the drying agent is lengthened. The accomplishment of such goals is achieved by this invention.

SUMMARY OF THE INVENTION

This invention, being a continuation-in-part of Ser. No. 937,063 filed Aug. 28, 1978, now U.S. Pat. No. 4,193,205, comprises a cylinder permitting access thereto of contaminated gas and egress therefrom of relatively clean gas. Interim of the cylinder an auger like member is positioned, causing the gas to follow a tortuous path between access and egress. Positioned within the cylinder, substantially filling the interior thereof, is a packing material comprised of a mass transfer media.

DESCRIPTION OF A PREFERRED EMBODIMENT

Figure 1:
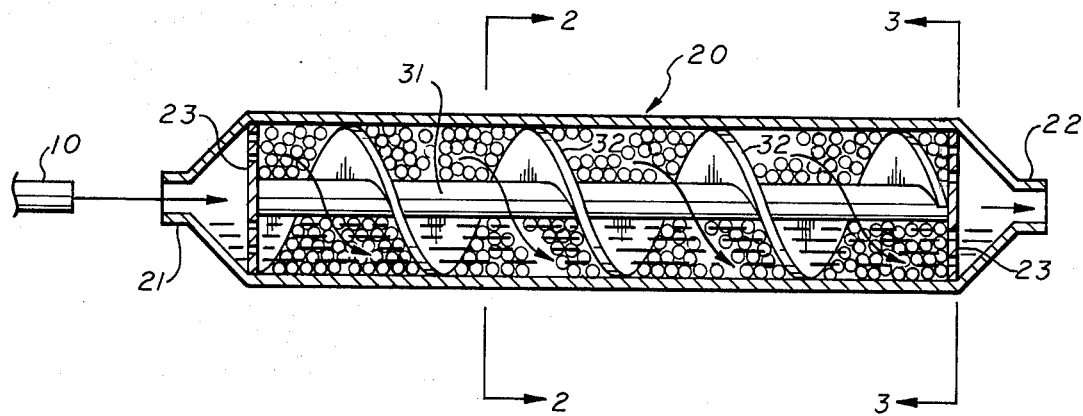
FIG. 1 is a vertical section through the contactor.
Figure 2:
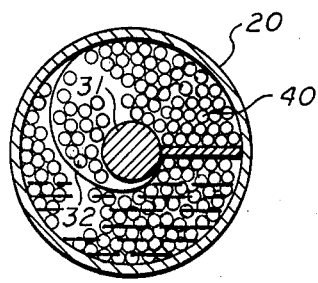
FIG. 2 is a section view taken along lines 2—2 of FIG. 1.
Figure 3:
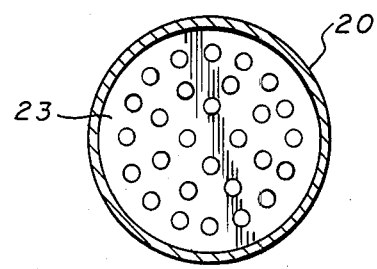
FIG. 3 is a sectional view taken along lines 3—3 of FIG. 1.

Looking first at FIG. 1, a source of gas 10 provides such contaminated gas to entry port 21 of cylinder 20. The opposite end 22 of cylinder 20 comprises a gas exit port. Adjacent each of said ports 21, 22, a perforated disc 23 is positioned, to fix the transfer media described hereinafter. This disc served as a screen, permitting gas passage through the perforations therein, but restricting passage of such mass media. Centrally positioned within cylinder 20, and extending axially thereof, is auger shaft 31, which may or may not be fixed to discs or screens 23. Such shaft has fins 32 spiraly extending therefrom, substantially between said discs. Placed within cylinder 20, intermediate discs 23, and substantially filling the interior of cylinder 20, is packing or mass transfer media, generally indicated at numeral 40. Such media would include a plurality of discreet elements, such as burl saddles, pall rings, rashing rings, crushed rock, pellets, or the like.

OPERATION OF THE INVENTION

A source of contaminated gas 10 would provide such gas to cylinder inlet 21, wherein it would pass through the apertures in the entry disc 23, into the principal interior of cylinder 20. Thereafter not only would such gas be caused to follow a generally spiralar path around shaft 31 and fins 32, but would also be caused to have the path of the gas components substantially dispersed by virtue of the elements of mass transfer or dispersing media 40. Inasmuch as a subtantial portion of cylinder 20, at least the lower half would be filled with an absorbent liquid, such as glycol, the gas would be assured of having intimate contact with such contaminant removing liquid. Thereafter, the gas would exit through port 22, after passing through the right hand of disc 23, to thereafter depart as relatively clean gas and pass through stills, reboilers, storage tanks, pumps and other standard equipment not forming a path of this invention. The disc perforations would be sized small enough so as to retain the dispersement media therebetween.

Although a single embodiment of this invention has been described, it should be obvious that numerous modifications are possible by one skilled in the art without departing from the spirit of the invention, the scope of which is limited only by the following claims:

I claim:

1. In a device for drying a gaseous media having a cylinder with inlet and outlet portions for a gaseous media, means for receiving and accommodating an absorbent liquid bath, and an auger member within said cylinder for causing said gaseous media to follow a generally spiralar path between said inlet and outlet portions, the improvement comprising:
    (a) a pair of screen members, oppositely positioned within said cylinder, adjacent, respectively, said inlet and outlet means, and
    (b) gas dispersing means, comprised of a large number of individual, unconnected, randomly arranged elements, for causing said gaseous media to follow a tortuous path around the shaft of said auger, substantially filling said cylinder intermediate said screen members.

2. The device of claim 1 wherein said screen members are perforated discs.

* * * * *